United States Patent
Williams

[11] Patent Number: 6,105,785
[45] Date of Patent: Aug. 22, 2000

[54] COMPOSITE ROLLERS FOR CONTINUOUS-BELT DRILLING MUD SEPARATION UNIT

[76] Inventor: J. Terrell Williams, P.O. Box 1821, Lake Charles, La. 70602

[21] Appl. No.: 09/146,938

[22] Filed: Sep. 3, 1998

Related U.S. Application Data

[60] Provisional application No. 60/060,941, Oct. 3, 1997.

[51] Int. Cl.$^7$ ................................. B07B 1/10; B07B 1/50
[52] U.S. Cl. .......................... 209/307; 209/272; 209/379; 209/384
[58] Field of Search ...................... 209/272, 307, 209/379, 384; 198/832, 834, 835

[56] References Cited

U.S. PATENT DOCUMENTS

| | | | |
|---|---|---|---|
| 1,151,243 | 8/1915 | Britton | 209/307 |
| 1,715,197 | 5/1929 | Grabill | 209/307 |
| 2,784,880 | 3/1957 | Pio | 198/834 |
| 2,929,507 | 3/1960 | Komline . | |
| 3,631,980 | 1/1972 | Hamachek | 209/307 |
| 3,724,285 | 4/1973 | Lapeyre | 198/834 |
| 3,851,791 | 12/1974 | Flider | 220/89 |
| 3,853,016 | 12/1974 | Lane, III et al. | 198/834 |
| 3,866,770 | 2/1975 | Palmer | 198/834 |
| 4,119,295 | 10/1978 | Blocker | 251/144 |
| 4,227,422 | 10/1980 | Kawashima et al. | 198/834 |
| 4,283,184 | 8/1981 | Berg | 198/834 |
| 4,337,672 | 7/1982 | Shiber | 198/834 |
| 4,770,711 | 9/1988 | Deal, III et al. | 134/18 |
| 4,836,067 | 6/1989 | Rogers et al. | 81/185 |
| 5,017,969 | 5/1991 | Mitomi et al. | 198/835 |
| 5,200,083 | 4/1993 | Kaylor | 210/671 |
| 5,507,382 | 4/1996 | Hartwell et al. | 198/837 |
| 5,863,430 | 1/1999 | Williams | 209/272 |
| 5,921,399 | 7/1999 | Bakula et al. | 209/272 |

FOREIGN PATENT DOCUMENTS

| | | |
|---|---|---|
| 1325859 | 3/1963 | France . |
| 2061751 | 5/1981 | United Kingdom . |

*Primary Examiner*—Donald P. Walsh
*Assistant Examiner*—Daniel Schlak
*Attorney, Agent, or Firm*—Finnegan, Henderson, Farabow, Garrett & Dunner, L.L.P.

[57] ABSTRACT

A pair of cylindrical composite rollers formed of a metallic drum having a thick outer elastomeric layer are mounted transversely in a rectangular frame of a drilling mud separation unit over which a wide endless-loop chain-link belt is driven in a continuous loop moving along the longitudinal axis of the frame. The drive roller has a plurality of axially spaced circumferential rows of radially extending teeth that are machined in the surface of the elastomeric material. The endless belt is formed of a plurality of laterally adjacent jointed links hinged together by transverse rods. As drilling mud or drilling fluids are conducted onto the moving belt, liquids and particles smaller than the openings in the belt pass through the openings and liquids and particles larger than the openings are transported on the moving belt and are discharged off of one end as the belt completes its path. The teeth of the drive roller are sized and spaced to receive and engage the plurality of laterally adjacent jointed links of the wide belt and are of sufficient length to protrude slightly beyond the outer surface of the links as they pass around the front drive roller to dislodge gumbo and other large solids which may otherwise stick in the openings of the links and clog the belt. The elastomeric roller surfaces and teeth reduce wear and prevent metal-to-metal contact and sparking.

8 Claims, 4 Drawing Sheets

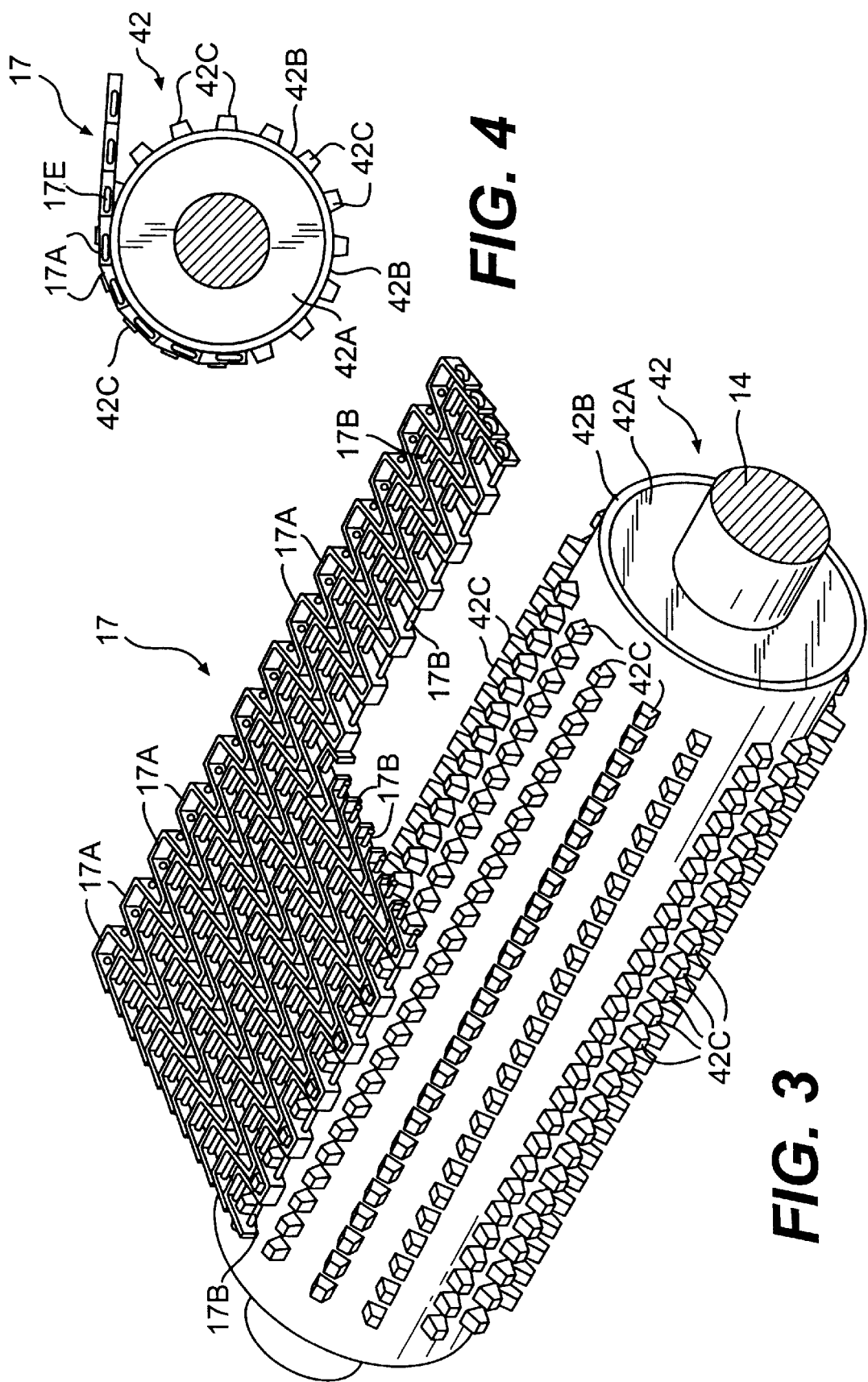

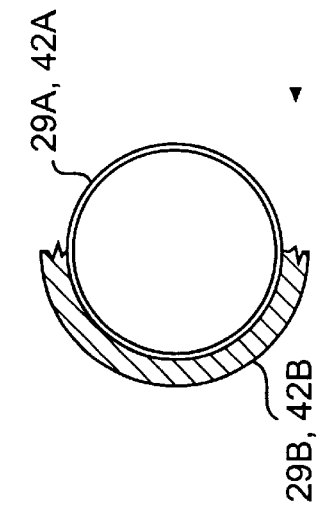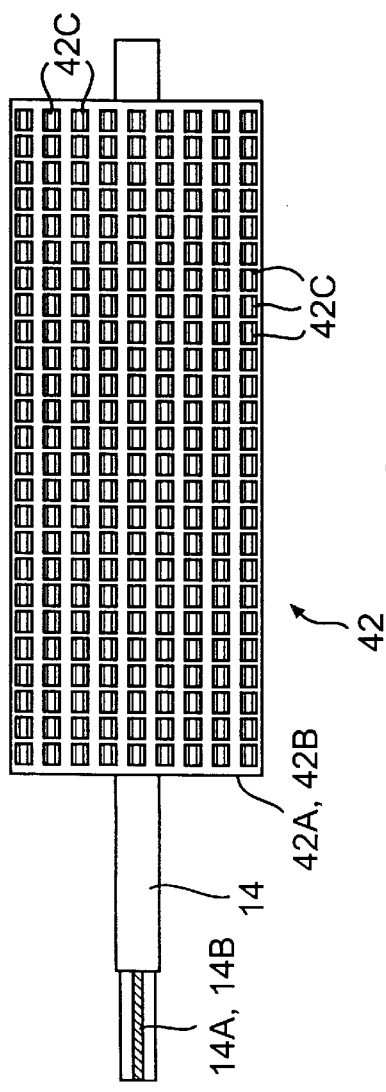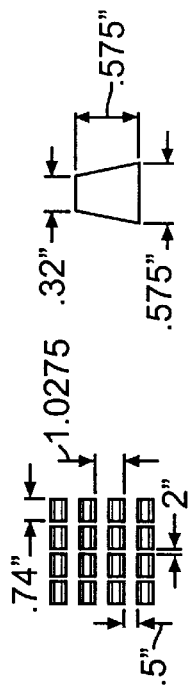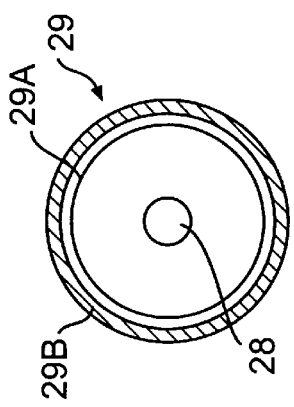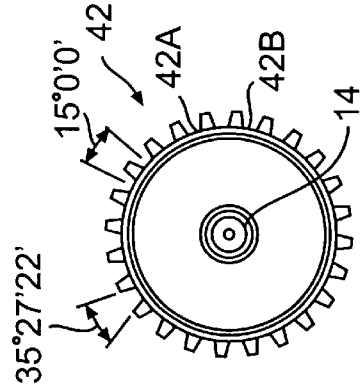

COMPOSITE ROLLERS FOR CONTINUOUS-BELT DRILLING MUD SEPARATION UNIT

This application claims the benefit of U.S. Provisional No. 60/060941 filed Aug. 3, 1997.

BACKGROUND OF THE INVENTION

1. Field of the Invention

This invention relates generally to drive rollers and drilling mud separation units, and more particularly to cylindrical composite rollers having a thick elastomeric outer layer for use in an endless-belt drilling mud separation unit, and a drive roller having a plurality of axially spaced circumferential rows of radially extending elastomeric teeth that receive and engage the openings in a wide belt formed of a plurality of laterally adjacent hinged links to drive the belt and reduce wear, prevent sparking, and dislodge materials which may otherwise clog the belt openings.

2. Brief Description of the Prior Art

Effective solids control systems for controlling the solids in drilling mud have been a goal in the oilfield industry for many years. Various systems have been employed to give higher penetration rates, less contamination of formations, lower mud costs, and less abrasive and sticky materials in the mud system. The systems which are most effective require expensive and complicated machinery and require personnel to monitor and maintain the machinery. Common apparatus used for mechanically removing solids from drilling mud include shale shakers and vibratory screens, desanders, desilters, mud cleaners, and centrifuges. Each piece of equipment is limited to a range of various particle sizes and selectively rejects undesirable solids and retains desirable solids in the drilling fluid.

The shale shakers and mud cleaners employ a vibrating screen to selectively classify particles by size differences. The desander, desilter, and centrifuge are usually located downstream from the shale shaker and utilize centrifugal force and mass difference between the solids density and liquid density for solids removal.

The initial removal step in most solids control systems is to conduct the drilling mud from the well directly to a shale shaker. Vibrating screen shale shakers of the type used in the oil industry fall into three general categories, as described below.

"Elliptical motion," or "unbalanced design" shakers have a downward slope on the screen to transport cutting across the screen and off the discharge end. Optimum screening with these types of shakers is usually in the range of 30–40 mesh (400–600 microns), and they are prone to bearing failure.

"Circular motion," or "balanced design" shakers produce a balanced, or generally circular motion. The consistent, circular vibration allows solids transport with the basket in a flat, horizontal orientation. This type of shaker usually has multiple decks to split the solids load and allows the use of finer mesh screens in the range of 80–100 mesh (150–180 microns).

"Linear motion," or "straight-line motion" shakers produce a generally straight motion. This motion is developed by a pair of eccentric shafts rotating in opposite directions. Linear motion shakers provide superior cutting conveyance and are able to operate at an uphill slope which allows the use of 200 mesh screens (77 microns).

Most prior art shakers tend to force the cuttings upward from the screen surface and as they continue upward the screen travels down, and as the cuttings fall downward, the screen travels upward and strikes the cuttings which chips small pieces off and creates very fine cuttings that are extremely difficult to remove. Shale shakers are prone to short screen life and their vibratory action tends to drive the cuttings into the screen and leads to screen "blinding" resulting in loss of fluid across the screen. "Blinding" is known as the phenomenon where near-size particles plug the screen or the screen becomes coated with sticky particles.

Lee, U.S. Pat. No. 4,146,483 discloses a segmented endless belt vibrating screen for removing solid particles from a stream of drilling fluid circulated therethrough. The screen assembly is formed of laterally spaced segments of one or more layers of open mesh screens interconnected by longitudinal rubber support belts disposed therebetween and a pair of rubber strips along the outermost lateral side edges. The rubber strips along the outermost lateral side edges are connected by L-shaped hooks to a pair of rubber V-belts which are received in V-shaped rollers with one set of rollers driven by a motor. The mesh screens are cleaned by a set of nozzles which direct a spray of water onto the screen at a point prior to it passing over a rubber wiper.

Hamacheck III, U.S. Pat. No. 3,631,980 discloses an open mesh belt cleaner for cleaning the bight openings of a link screen conveyer belt in a pea-harvesting machine. The endless belt link screen is supported and driven by a sprocket at each lateral side of the belt which have teeth that engage the links of the belt. The belt cleaner comprises one or more bars which extend transversely between the sprockets and each bar replaces one of the teeth of the opposed sprockets. The bar is provided with a series of debris expelling metal teeth along its length in staggered registry with certain ones of the openings in the belt to penetrate the openings of different rows in successive passes of the belt. Hamacheck III states that it would be undesirable to employ the metal teeth to clean all the successive rows of belt openings in every pass of the belt.

The present invention is distinguished over the prior art in general and these patents in particular by a pair of cylindrical composite rollers formed of a metallic drum with a thick outer elastomeric layer that are mounted transversely in a rectangular frame of a drilling mud separation unit over which a wide endless-loop chain-link belt is driven in a continuous loop moving along the longitudinal axis of the frame. The drive roller has a plurality of axially spaced circumferential rows of radially extending teeth that are machined in the surface of the elastomeric material. The endless belt is formed of a plurality of laterally adjacent jointed links hinged together by transverse rods. As drilling mud or drilling fluids are conducted onto the moving belt, liquids and particles smaller than the openings in the belt pass through the openings and liquids and particles larger than the openings are transported on the moving belt and are discharged off of one end as the belt completes its path. The teeth of the drive roller are sized and spaced to receive and engage the plurality of laterally adjacent jointed links of the wide belt and are of sufficient length to protrude slightly beyond the outer surface of the links as they pass around the front drive roller to dislodge gumbo and other large solids which may otherwise stick in the openings of the links and clog the belt. The elastomeric roller surfaces and teeth reduce wear and prevent metal-to-metal contact and sparking.

SUMMARY OF THE INVENTION

It is therefore an object of the present invention to provide composite rollers having an outer layer of elastomeric material which have good wear characteristics in abrasive soil and weather conditions and are suitable for use in constant exposure to drilling fluids and mud such as on oil field and offshore drilling rig drilling mud separation equipment.

It is another object of this invention to provide composite rollers having an outer layer of elastomeric material which will prevent metal to metal contact on relatively moving parts and thereby reduce the chances of sparking in potentially hazardous environments.

Another object of this invention is to provide composite rollers having a layer of elastomeric material which will reduce friction and heat between relatively moving parts and thereby extend the useful life of the metal parts.

A further object of this invention is to provide long-lasting composite rollers having an outer layer of elastomeric material which support and drive a wide continuous-belt around the rollers in a continuous loop.

A still further object of this invention is to provide a long-lasting composite roller having an outer layer of elastomeric material with teeth formed in the elastomeric material that engage and continuously clean the openings in the links of a wide continuous-loop chain link belt as the belt completes its path.

Other objects of the invention will become apparent from time to time throughout the specification and claims as hereinafter related.

The above noted objects and other objects of the invention are accomplished by a pair of cylindrical composite rollers formed of a metallic drum with a thick outer elastomeric layer that are mounted transversely in a rectangular frame of a drilling mud separation unit over which a wide endless-loop chain-link belt is driven in a continuous loop moving along the longitudinal axis of the frame. The drive roller has a plurality of axially spaced circumferential rows of radially extending teeth that are machined in the surface of the elastomeric material. The endless belt is formed of a plurality of laterally adjacent jointed links hinged together by transverse rods. As drilling mud or drilling fluids are conducted onto the moving belt, liquids and particles smaller than the openings in the belt pass through the openings and liquids and particles larger than the openings are transported on the moving belt and are discharged off of one end as the belt completes its path. The teeth of the drive roller are sized and spaced to receive and engage the plurality of laterally adjacent jointed links of the wide belt and are of sufficient length to protrude slightly beyond the outer surface of the links as they pass around the front drive roller to dislodge gumbo and other large solids which may otherwise stick in the openings of the links and clog the belt. The elastomeric roller surfaces and teeth reduce wear and prevent metal-to-metal contact and sparking.

The accompanying drawings, which are incorporated in and constitute a part of this specification, illustrate one embodiment of the present invention and together with the description, serve to explain the principles of the present invention.

BRIEF DESCRIPTION OF THE DRAWINGS

FIG. 3 is an isometric view of a toothed drive roller and self-cleaning chain link belt for use in the separation uni;

FIG. 4 is a side elevation view of a portion of the self-cleaning chain link belt and toothed drive roller arrangement;

FIG. 5 is a transverse cross section through the composite rollers showing a portion of the elastomeric outer layer;

FIG. 6 is a transverse cross section through a rear roller having a smooth elastomeric outer layer;

FIG. 7 is an elevation view of the toothed drive roller;

FIG. 8 is a transverse cross section through the toothed roller showing the teeth formed in the elastomeric layer; and FIGS. 9 and 10 are illustrations of a typical tooth spacing arrangement and typical tooth profile.

DETAILED DESCRIPTION OF THE PRESENT INVENTION

The cylindrical composite rollers in accordance with the present invention are formed of a metallic drum having a thick outer layer of elastomeric material, preferably urethane, and are particularly suited for use in a self-cleaning continuous belt drilling mud separation system such as the one described in copending U.S. patent application Ser. No. 08/848,807, which is hereby incorporated herein by reference.

Figure 1:
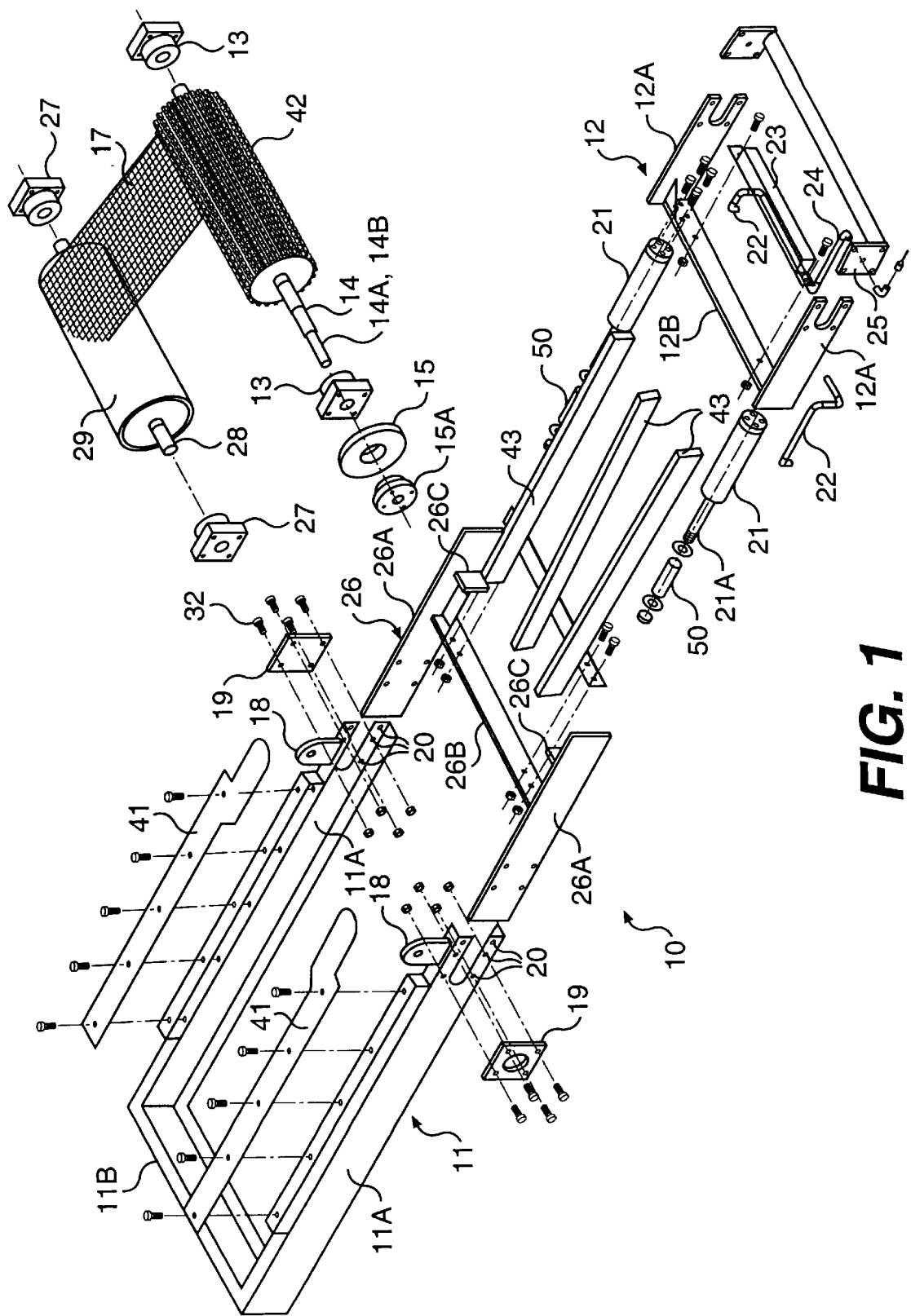
FIG. 1 is an exploded isometric view of the drilling mud separation unit in which the composite rollers in accordance with the present invention are to be installed.
Figure 2:
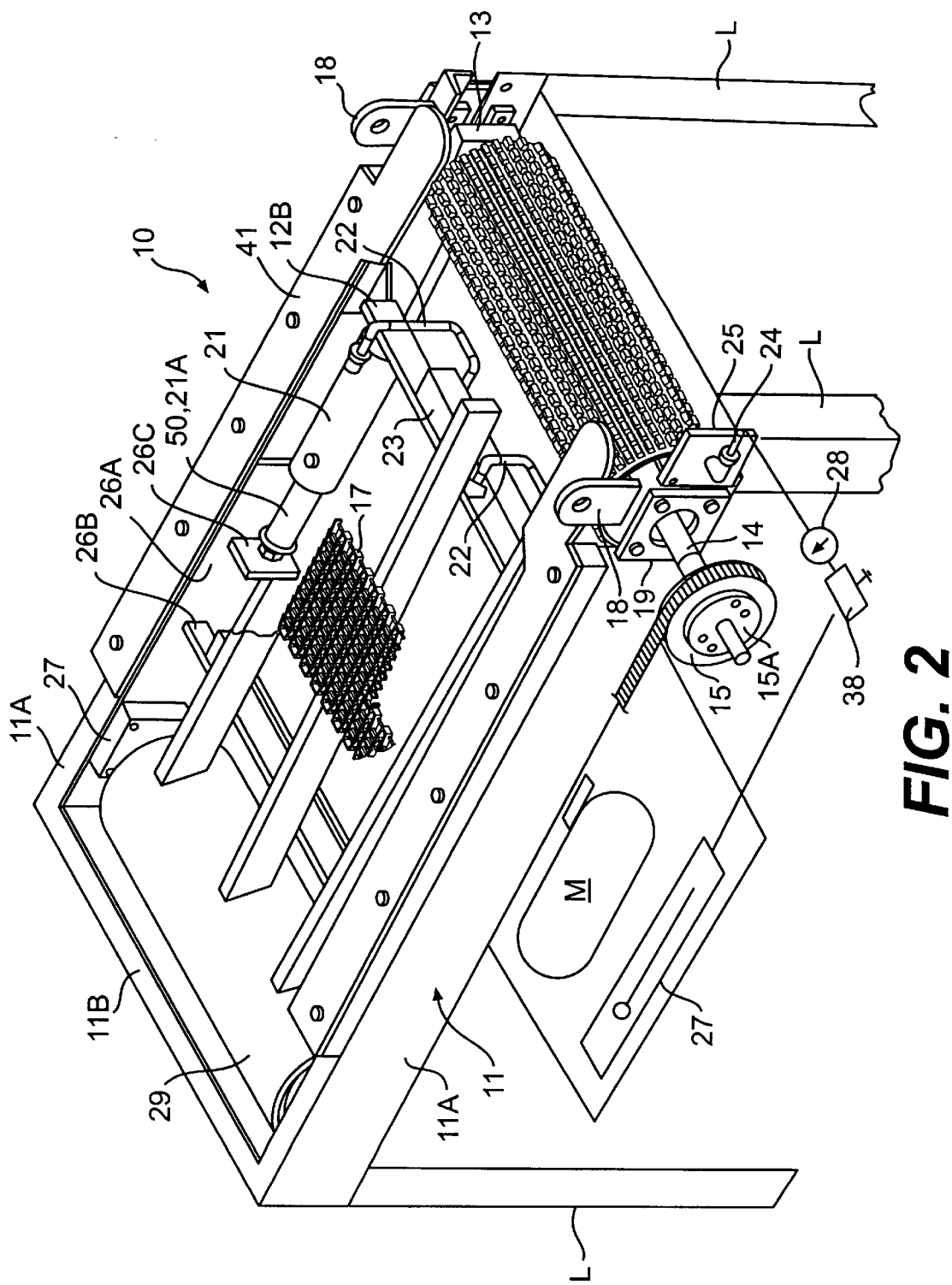
FIG. 2 is an isometric view in the assembled condition of an embodiment of the separation unit showing the rollers installed.

Referring now to FIGS. 1 and 2, the drilling mud separation unit 10 in which the rollers are to be installed has a generally rectangular outer frame assembly 11 formed of side and rear C-shaped channel members 11A and 11B, respectively, that supports an inner front tensioning frame assembly 12, an inner rear tensioning frame assembly 26, and other components. The separation unit 10 is shown in an unassembled condition in FIG. 1, and in an assembled condition in FIG. 2. The endless-loop chain link belt 17 is shown schematically in FIGS. 1 and 2, but is shown in greater detail in FIGS. 4 and 5.

The inner front tensioning frame assembly 12 is a generally U-shaped configuration formed of a pair of laterally opposed rectangular side plate members 12A with a transverse rectangular crossmember plate 12B secured between the inner facing ends of the side plates. Front bearings 13 are mounted at the outer ends of the opposed plates 12A. The U-shaped inner front tensioning frame assembly 12 carrying the front bearings 13 and drive roller 42 is fixedly connected to the front end of the outer frame assembly 11 by spacer plates 19. The axle 14 of the front drive roller 42 is journalled in the front bearings 13 and its outer ends extend through the front bearings 13 and through the outer frame assembly 11 to receive a drive sheave 15 on either the right or left side of the outer frame 11. Thus, the drive sheave 15 can be located on either the left or the right side of the outer frame 11. A keyway 14A, key 14B, and retainer hub 15A secure the drive sheave 15 onto the axle 14.

Lifting eyes 18 are secured to the front end of the outer frame assembly 11 to lift and move the separation unit 10 as required. The inner front tensioning frame assembly 12, spacer plates 19, and the front bearings 13 are attached to the outer frame assembly 11 to make the front of the separation unit 10 rigid. Holes 20 are located on the front of the outer frame assembly 11 to attach the inner front tensioning frame assembly 12, front bearings 13, and spacer plates 19.

The inner rear tensioning frame assembly 26 is a generally H-shaped configuration formed of a pair of laterally opposed rectangular side plate members 26A with a transverse rectangular crossmember plate 26B secured between the side plates and laterally opposed end plates 26C secured near the front ends of the side plates. Rear bearings 27 are mounted at the rear ends of the opposed plates 26A. The axle 28 of the rear roller 29 is journalled in the bearings 27. The H-shaped inner rear tensioning frame assembly 26 carrying the rear bearings 27 and rear roller are not rigidly connected to outer frame assembly 11. Instead, the inner rear tensioning frame assembly 26 is slidably received in the C-shaped side channels of the outer frame 11.

Tensioning cylinders 21 are mounted on the inner front tensioning frame assembly 12 and the outer ends of their piston rods 21A are connected to the end plates 26C at the front ends of the side plates 26B of the inner rear tensioning frame assembly 26. Fluid lines 22 connect the tensioning cylinders 21 to a reservoir 23 which is mounted on the transverse crossmember 12B of the inner front frame assembly 12. The reservoir 23 contains a fluid medium (air or hydraulic) with which to operate the tensioning cylinders 21. A fluid line 24 connected to the reservoir 23 extends through a mounting plate 25 attached to the side of the outer frame assembly 11. An air or hydraulic supply line from the rig may be connected to the line 24 to supply air or hydraulic fluid to the tensioning system.

The outer ends of the piston rods 21A of the tensioning cylinders 21 are connected to the end plates 26C at the front ends of the side plates 26B of the inner rear frame assembly 26. The inner rear frame assembly 26 and rear roller 29 are moved along the C-shaped side channels of the outer frame 11 relative to the outer frame by the tensioning cylinders 21.

Thus, the inner rear tensioning frame assembly 26 carrying the rear roller 29 slides relative to the outer frame 11 and inner front tensioning frame assembly 12 upon extension or retraction of the piston rods 21A of the tensioning cylinders 21. When the piston rods 21A are extended the inner rear frame assembly 26 and rear roller 29A move rearwardly to apply and maintain tension in the moving chain link belt 17. Tubular collars or spacers 50 pay be installed on the piston rods 21A to prevent them from retracting and maintain the tension in the belt 17.

A pair of laterally opposed parallel elongate rectangular guide/support bars 43 are connected at one end to the crossmember 26B of the inner rear tensioning frame assembly 26 and extend forward toward the front of the separation unit 10 and over the crossmember 12B of the inner front tensioning frame assembly 12 to support the chin link belt 17. The guide/support bars 43 move with the inner rear tensioning frame assembly 26 relative to the outer frame 11 as tension is applied or relaxed by the tensioning cylinders 21.

A pair of elongate flat guard rails 41 are mounted at the top ends of the C-shaped channels of the outer frame 11 after the moving chain link belt 17 is installed. The guard rails 41 extend inwardly from the sides of the outer frame assembly 11 over the lateral edges of the moving chain link belt 17 and forwardly over the lateral ends of the drive roller 42.

The drive roller 42 and hence the chain link belt 17 is driven by a variable or fixed speed external motor (not shown) which is releasably connected to the drive sheave 15 on the outwardly extended end of the drive roller drive shaft 14.

As briefly stated above, the separation unit 10 is installed in a box-like housing which is shown and described in copending U.S. patent application Ser. No. 08/848,807, which is mounted in the flow path of the drilling mud or drilling fluids on a drilling rig and serves to operate the separation unit or units 10 to separate solids from drilling fluids or drilling muds obtained from a well bore.

Referring now additional to FIGS. 3 and 4, the wide endless-loop chain link belt 17 passes around the front drive roller 42 and rear roller 29. The front drive roller 42 which is used to drive the wide chain link belt 17 has a plurality of axially spaced circumferential spaced rows of radially extending teeth 42C. The self-cleaning chain link belt 17 is a wide endless loop belt formed of a plurality of adjacent jointed chain links 17A hingedly connected together by a plurality of parallel spaced transversely extending rods 17B. The endless loop chain link belt 17 passes around the front drive roller 42 and rear roller 29. As explained in detail hereinafter, the teeth 42C of the drive roller 42 are sized and spaced to be received in the apertures of the jointed chain links 17A. As shown in FIG. 4, the teeth 42C are of sufficient length to protrude slightly beyond the outer surface of the links 17A as they pass around the front drive roller 42. The toothed front drive roller 42 and chain link belt 17 arrangement is particularly useful in removing gumbo and other large solids which may otherwise stick in the openings of the links and clog the belt. As shown somewhat schematically in FIG. 4, a rectangular wiper blade W formed of resilient elastomeric material sandwiched between two rectangular metal straps may be secured transversely across the front of the frame to wipe the outer surface of the chain link belt 17 as it passes around the drive roller 42.

FIGS. 5, 6, 7, and 8 illustrate preferred embodiments of the composite rear roller 29 and front drive roller 42 which are mounted at opposite ends of the frame of the drilling mud separation unit described above and over which the wide endless-loop chain link belt 17 passes. The rear roller 29 (FIGS. 5 and 6) is formed of a cylindrical metal drum 29A approximately 22" to 24" in length having an outer diameter of from about 7⅜" to about 7½" and an outer layer 29B of elastomeric material of from about 1" to about 1⅛" thick molded or bonded onto its exterior surface. The outer ends of the roller are enclosed by circular end plates having a central collar or aperture through which the axle is secured to extend outwardly from each end. The rear roller 29 (FIG. 6) has a smooth outer layer of elastomeric material.

The toothed drive roller 43 (FIGS. 7 and 8) is also formed of a cylindrical metal drum 42A approximately 22" to 24" in length having an outer diameter of from about 7⅜" to about 7½" and an outer layer 42B of elastomeric material of from about 1" to about 1⅛" thick molded or bonded onto the exterior surface of the drum and its outer ends are enclosed by circular end plates having a central collar through which an axle is secured to extend outwardly from each end and one outer end of its axle is provided with a keyway.

After the elastomeric layer has been molded or bonded onto the drum, the elastomeric material is machined down to form a plurality of axially spaced circumferential rows of radially extending teeth 42C formed out of the elastomeric material by a machining operation. FIGS. 7, 8, 9, and 10 illustrate one example of a typical tooth arrangement and tooth profile. In this example, there are 25 axially spaced circumferential rows of teeth each having a width in the axial direction of about 0.74" with a space of about 0.2" between each row. There are 24 circumferentially spaced teeth in each row extending radially outward with their centerlines spaced about 15° apart with a transverse circular pitch of about 1.0275". Each tooth has a transverse thickness of about 0.575" and tapers upwardly to a height of about 0.575" to form an included pressure angle of about 35°27' between the opposed slanted surfaces.

It should be understood that the foregoing tooth description is merely one example of a toothed surface, and that many other variations may be made, depending upon the particular application, type of endless belt used, and rotational speed, without departing from the scope of the present invention. For example, the rows of teeth may be arranged in one or more spirals encircling the drum and may be of different profiles, i.e., round, square, dovetail, triangle, rectangle, parallelogram, hexagon, or octagon, etc. The transverse and longitudinal cross section area of the urethane teeth should be sufficient to withstand torquing, side load, back load, torsional twisting, and temperature. The included angle of the teeth should be sufficient to provide clearance between the apertures of the belt and be self cleaning as the roller rotates. The pressure angle of the teeth would also be a determining factor as to such things as the number of teeth, number of rows, the tooth profile, and pitch or lead.

The composite rollers of the present invention are utilized with the wide endless-loop chain link belt to remove large drill solids, heavy clays, and gumbo (sticking clays) from the drilling mud or drilling fluid prior to the drilling fluid or drilling mud flowing to conventional solids control equipment such as shale shakers to lessen the stoppage of flow of drilling mud and drilling fluids in their flow lines which thereby improves the performance of such equipment and reduces the cost of drilling operations. The elastomeric roller surfaces and teeth reduce wear and prevent metal-to-metal contact and sparking.

The moving chain link belt 17 is rotated around the drive roller 42 in an endless loop and passes underneath the separation unit 10 towards the rear roller 29. The moving chain link belt 17 then passes around the rear roller 29 and moves underneath the flow of drilling mud or filling fluid from the well bore where large solids and gumbo from the well bore area deposited on the moving chain link belt 17. The moving chain link belt 17 continues forward movement across the guide/support bars 43 to the front drive roller 42.

As the drilling mud or drilling fluids along with the drill solids and gumbo to be separated flow across the moving chain link belt 17, the liquid part of the drilling mud or drilling fluid along with smaller particles of drill solids fall through the openings of the chain link belt 17. Larger drill solids and gumbo are caught on the moving chain link belt 17 and are transported to the front of the separation unit 10.

As the moving chain link belt 17 passes under the front drive roller 42, the large drill solids and gumbo are discharged off the moving chain link belt 17 into a suitable discharge receptacle, pipe, conveyor, or other means as may be provided at each unit location. The teeth 42C of the drive roller 42 are received in the apertures of the jointed chain links 17A and protrude therethrough to dislodge and remove gumbo and other large solids which may be stuck in the openings of the links to clean and unclog the belt in each pass of the links 17A around the front drive roller.

It should be understood that as drilling conditions vary such as size of hole drilled, drilling rate, type of drilling fluids or drilling mud used, type of formation drilled, volume of drilling mud or drilling fluids circulated per unit of time such as gallons per minute, the moving chain link belt 17 may be varied in size of spacing between links, joints, mesh or along with the toothed arrangement of the drive roller 42.

Other embodiments of the present invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A drilling mud separation apparatus comprising, a frame, an endless loop chain-link belt, a drive roller journalled for driving rotation at one end of said frame, an idler roller journalled for rotation at an opposite end of said frame, with said belt passing around said drive roller and said idler roller, said drive roller having a roll body with a plurality of teeth extending from said roll body, said teeth being constructed of a material that will not result in sparking upon contact with metal, said belt having a plurality of adjacent, jointed chain links hingedly connected together to form a plurality of apertures in said belt, said teeth of said roll body being received by and extending into said apertures and protruding therethrough and beyond an outer surface of said belt during said passing of said belt around said drive roller.

2. The drilling mud separation apparatus of claim 1, wherein said roll body has thereon a layer of an elastomeric material of which said teeth are formed.

3. The drilling mud separation apparatus of claim 1, wherein said drive roller and said idler roller have thereon a layer of elastomeric material for preventing sparking.

4. The drilling mud separation apparatus of claim 2, wherein said idler roller has a roll body around which said belt passes, with said roll body having thereon a layer of an elastomeric material.

5. The drilling mud separation apparatus of claim 4, wherein said teeth are radially extending from said roll body in axially spaced circumferential rows.

6. The drilling mud separation apparatus of claim 5, wherein said chain links are hingedly connected by transverse rods.

7. The drilling mud separation apparatus of claim 6, wherein drilling mud or drilling fluids are conducted onto said belt during movement thereof, with liquids and particles smaller than said apertures passing through said belt and liquids and particles larger than said apertures being transported on said belt and being discharged off one end of said belt as said belt completes a path around said drive roller and idler roller.

8. The drilling mud separation apparatus of claim 7, wherein said apparatus is operatively mounted on a drilling rig in a flow path of drilling fluids.

* * * * *